FIG. 1.

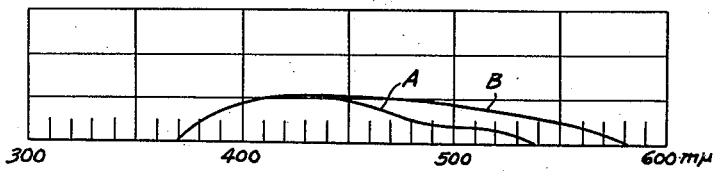

A = 2-(p-diethylaminostyryl)pyridine ethiodide
B = 2-(p-diethylaminostyryl)pyridine ethiodide and
  4[(3-ethyl-2(3)-benzothiazolylidene) isopropylidene]-
  3-methyl-1-p-sulfophenyl-5-pyrazolone

FIG. 2.

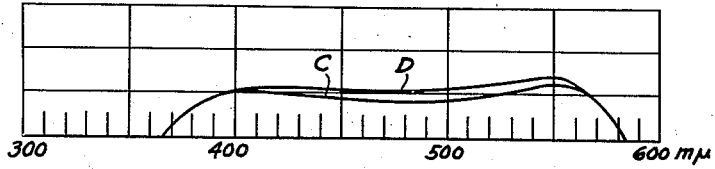

C = 3,1'-diethyl-6'-methyl-4,5-benzothia-2'-cyanine bromide
D = 3,1'-diethyl-6'-methyl-4,5-benzothia-2'-cyanine bromide
  and 4[(3-ethyl-2(3)-benzothiazolylidene) isopropylidene]
  -3-methyl-1-p-sulfophenyl-5-pyrazolone

FIG. 3.

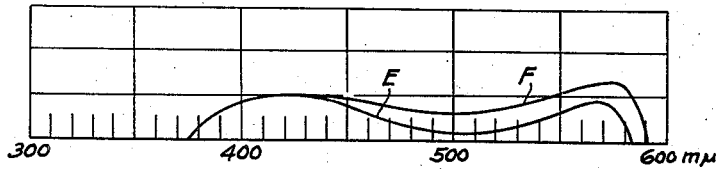

E = 1,1'-diethyl-2,2'-cyanine iodide
F = 1,1'-diethyl-2,2'-cyanine iodide and 4-[(3-ethyl-
  2(3)-benzothiazolylidene) ethylidene]-3-methyl-1-
  p-sulfophenyl-5-pyrazolone

BURT H. CARROLL
LESLIE G. S. BROOKER
JOHN SPENCE
INVENTORS

BY
ATTORNEYS

Patented Nov. 11, 1947

2,430,558

UNITED STATES PATENT OFFICE 2,430,558

PHOTOGRAPHIC EMULSION SENSITIZED WITH COMBINATION OF MEROCYANINE DYE AND A MONOMETHINECYANINE, A TRIMETHINECYANINE, A DIMETHINE-HEMICYANINE, OR A STYRYL DYE

Burt H. Carroll, Leslie G. S. Brooker, and John Spence, Rochester, N. Y., assignors to Eastman Kodak Company, Rochester, N. Y., a corporation of New Jersey Application October 26, 1945, Serial No. 624,944

17 Claims. (Cl. 95—7)

This invention relates to sensitized photographic emulsions and to a process for the preparation thereof.

It is known that photographic silver halide emulsions can be spectrally (optically) sensitized with certain dyes which adsorb directly on the silver halide. It is also known that acid and basic sensitizing dyes are relatively incompatible; for example, sensitization by means of combinations of eosin dyes and cyanine dyes is generally weaker than the sum of the individual effects produced by eosin dyes (acid) and the cyanine dyes (basic).

We have now found, however, that combinations of one or more acid merocyanine dyes with one or more basic dyes selected from the group consisting of monomethine cyanine dyes (or salts), trimethine cyanine dyes (or salts), dimethine hemicyanine dyes (or salts) and styryl dyes (or salts) produce sensitization in some spectral region greater than can be attained by either the acid merocyanine dye alone or by the basic dye alone.

Among the acid merocyanine dyes which are useful in practicing our invention are a considerable number of weak sensitizers which are not strongly adsorbed on the silver halide grains of the emulsion. In the presence of the aforesaid basic cyclammonium quaternary salt dyes, the cations of which are adsorbed on the silver halide grains, however, the sensitization produced by these weakly sensitizing acid merocyanine dyes is markedly increased and frequently greatly changed in distribution. In still other cases, the acid merocyanine dyes act as unusually powerful supersensitizers of the basic dyes. In fact certain cyanine dyes which in and of themselves show no sensitizing action, sensitize silver halide emulsions, in the presence of the acid merocyanine dyes. Among the acid merocyanine dyes which supersensitize the basic dyes, are both weakly sensitizing and strongly sensitizing acid merocyanine dyes.

Generally speaking the stronger the sensitization produced by the acid merocyanine dye, the stronger the dye is adsorbed to the silver halide grains and the smaller the effect produced by the basic dye on the acid merocyanine dye.

It is, accordingly, an object of our invention to provide sensitized photographic emulsions. A further object is to provide a process for preparing such emulsions. Other objects will become apparent hereinafter.

In accordance with our invention, we incorporate in a photographic silver halide emulsion at least one basic dye selected from the group consisting of monomethine cyanine dyes, trimethine cyanine dyes, dimethine hemicyanine dyes and styryl dyes and at least one merocyanine dye selected from those represented by the following general formula:

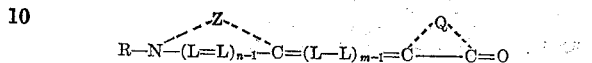

wherein R represents an alcohol radical (i. e., an alkyl group substituted or unsubstituted) e. g., methyl, ethyl, n-butyl, isobutyl, allyl, $\beta$-ethoxyethyl, $\beta$-hydroxyethyl, $\beta$-acetoxyethyl, carbethoxy-methyl, $\beta$-phenylethyl or benzyl, or R represents an aryl group, e. g., phenyl, L represents a methine group substituted or unsubstituted, $n$ represents a positive integer from 1 to 2, $m$ represents a positive integer from 2 to 3, Q represents the non-metallic atoms necessary to complete a heterocyclic nucleus containing 5 atoms in the heterocyclic ring, e. g., a rhodanine nucleus, a 2-thio-2,4(3,5)-oxazoledione nucleus, a 2-thiohydantoin nucleus, a 5-pyrazolone nucleus, etc., said heterocyclic nucleus containing at least one group selected from the group consisting of sulfo (—SO$_3$H) and carboxyl groups (—COOH). The sulfo and carboxyl groups can be attached directly to the heterocyclic nucleus or attached through another atom or group of atoms as in sulfoalkyl, carboxyalkyl, sulfoaryl and carboxyaryl groups. Z in the above formula represents the non-metallic atoms necessary to complete a heterocyclic nucleus containing from 5 to 6 atoms in the heterocyclic ring, e. g., a nucleus of the benzothiazole series, a nucleus of the benzoxazole series, a nucleus of the benzoselenazole series, a nucleus of the $\alpha$-naphthothiazole series, a nucleus of the $\beta$-naphthothiazole series, a nucleus of the $\alpha$-naphthoxazole series, a nucleus of the $\beta$-naphthoxazole series, a nucleus of the $\alpha$-naphthoselenazole series, a nucleus of the $\beta$-naphthoselenazole series, a nucleus of the thiazoline series, a nucleus of the simple thiazole series (e. g., 4-methylthiazole, 4-phenylthiazole, 4-(2-thienyl)thiazole, etc.), a nucleus of the simple selenazole series (e. g., 4-methylselenazole, 4-phenylselenazole, etc.), a nucleus of the simple oxazole series (e. g., 4-methyloxazole, 4-phenyloxazole, etc.), a nucleus of the quinoline series, a nucleus of the pyridine series, a nucleus of the 3,3-dialkylindolenine series, etc. The ammonium (substituted or unsubstituted) or metal salt forms of the dyes can also be employed. The dyes (including their metal and ammonium salt forms) in which Q represents the non-metallic atoms necessary to complete a 5-pyrazolone nucleus containing a carboxy and/or sulfo group are most advantageously employed in practicing our invention.

Usually in practicing our invention, we employ the acid merocyanine dyes in a concentration of not more than 0.25 gram per gram-mole of silver halide in the emulsion although higher concentrations can be used. Most frequently the acid merocyanine dye is employed in a concentration from about 0.025 to about 0.15 gram per gram-mole of silver halide in the emulsion.

The quantity of basic dye employed may be several times greater than the concentration of the acid merocyanine dye or its salt. Generally speaking, the most useful concentration of the basic dye is from 2 to 3 times the concentration of the acid merocyanine dye, although larger or smaller concentrations can be employed. Equal concentrations of the acid merocyanine dye and the basic dye sometimes give the best results. The most effective concentration of the cyclammonium quaternary salt will be apparent upon making the usual tests and observations customarily employed in the art.

The following examples will serve to illustrate further the manner of practicing our invention. To different portions of the same batch of photographic gelatino-silver-bromiodide emulsion were added (1) a basic dye, (2) an acid merocyanine dye and (3) a combination of the basic dye and the acid merocyanine dye. The different portions of emulsion were then coated on glass supports and exposed in the usual manner in a spectrograph and in a sensitometer to white light and through filters, including a minus blue filter i. e., a filter which transmits substantially no light of wavelength shorter than 500 m$\mu$. Following are several examples of such emulsions together with the speed (clear or white light and minus blue) and gamma obtained.

| | Dye (g. per mole of silver halide in emulsion) | Clear | | Minus Blue | |
|---|---|---|---|---|---|
| | | Speed | Gamma | Speed | Gamma |
| Ex. 1 | (a) 3,1'-diethyl-6'-methyl-4,5-benzothia-2'-cyanine bromide (0.085) | 107 | 2.60 | 29.5 | 2.78 |
| | (b) 4-[(3-ethyl-2(3)-benzothiazolylidene)-isopropylidene]-3-methyl-1-p-sulfophenyl-5-pyrazolone (0.043) | | | too weak to measure accurately. | |
| | (c) Combination of dye (a) (0.085) with dye (b) (0.043) | 162 | 2.64 | 57.5 | 2.68 |
| Ex. 2 | (c) 3,3'-diethyl-9-methyloxacarbocyanine bromide (0.085) | 870 | 1.71 | 275 | 1.60 |
| | (d) 4-[(3-ethyl-2(3)-benzothiazolylidene)-isopropylidene]-3-methyl-1-p-sulfophenyl-5-pyrazolone (0.085) | | | too weak to measure accurately. | |
| | (e) Combination of dye (c) (0.085) with dye (d) (0.085) | 1000 | 1.77 | 500 | 1.69 |
| Ex. 3 | (f) 2-(p-diethylamino-styryl) pyridine ethiodide (0.043) | 72.5 | 2.14 | <1. too low to give figures. | |
| | (g) 4-[(3-ethyl-2(3)-benzothiazolylidene)isopropylidene]-3-methyl-1-p-sulfophenyl-5-pyrazolone (0.043) | | | too weak to measure accurately. | |
| | (h) Combination of dye (f) (0.043) with dye (g) (0.043) | 126.0 | 2.19 | 16.0 | 2.19 |
| Ex. 4 | (i) 1,1'-diethyl-6,6'-dimethyl-2,4'-cyanine iodide (0.043) | 64.5 | 2.12 | 12.6 | 1.63 |
| | (j) 4-[(3-ethyl-2(3)-benzothiazolylidene)-isopropylidene]-3-methyl-1-p-sulfophenyl-5-pyrazolone (0.043) | | | too weak to measure accurately. | |
| | (k) combination of dye (i) (0.043) and dye (j) (0.043) | 95.5 | 2.33 | 31.0 | 2.27 |
| Ex. 5 | (l) 1,1'-diethyl-2,2'-cyanine iodide (0.085) | 79.5 | 1.99 | 21.5 | 1.29 |
| | (m) 4-[(3-ethyl-2(3)-benzothiazolylidene)-ethylidene]-3-methyl-1-p-sulfophenyl-5-pyrazolone (0.043) | | | too weak to measure accurately. | |
| | (n) combination of dye (l) (0.085) and dye (m) (0.043) | 110.0 | 2.02 | 36.5 | 2.00 |
| Ex. 6 | (o) 1,1'-diethyl-2,2'-cyanine iodide (0.085) | 79.5 | 1.99 | 21.5 | 1.29 |
| | (p) 4-[(1-ethyl-2(1)-β-naphthothiazolylidene]-ethylidene]-3-methyl-1-p-sulfophenyl-5-pyrazolone (0.043) | 72.5 | 2.43 | 7.75 | 2.3 |
| | (q) combination of dye (o) (0.085) with dye (p) (0.085) | 170.0 | 2.06 | 97.5 | 1.99 |
| Ex. 7 | (r) 3,3'-ethylenethia-cyanine iodide (0.085) | | | too weak to measure accurately. | |
| | (s) 4-[(3-ethyl-2(3)-benzothiazolylidene)-ethylidene]-3-methyl-1-p-sulfophenyl-5-pyrazolone, pyridine salt (0.085) | | | too weak to measure accurately. | |
| | (t) combination of dye (r) (0.085) with dye (s) (0.085) | 148.0 | 2.24 | 23.5 | 2.29 |
| Ex. 8 | (u) 3,3'-ethylene-thiacyanine iodide (0.085) | | | too weak to measure accurately. | |
| | (v) 4-[(1-ethyl-2(1)-β-naphthothiazolylidene)-ethylidene]-3-methyl-1-p-sulfophenyl-5-pyrazolone, pyridine salt (0.043) | 72.5 | 2.43 | 7.75 | 2.30 |
| | (w) combination of dye (u) (0.085) with dye (v) (0.043) | 128 | 2.14 | 31.00 | 2.50 |
| Ex. 9 | (x) 2-[β-(1-piperidyl)-vinyl]-β-naphthothiazole ethiodide (0.085) | | | too weak to measure accurately. | |
| | (y) 4-[(1-ethyl-2(1)-β-naphthothiazolylidene)-ethylidene]-3-methyl-1-p-sulfophenyl-5-pyrazolone (0.043) | 72.5 | 2.43 | 7.75 | 2.30 |
| | (z) combination of dye (x) (0.085) with dye (y) (0.043) | 69.0 | 2.28 | 10.2 | 2.45 |
| Ex. 10 | (a₁) 3,3'-ethylene thiacyanine iodide (0.085) | | | too weak to measure accurately. | |
| | (b₁) 4-[(3-ethyl-2(3)-benzothiazolylidene)-2-butenylidene]-3-methyl-1-p-sulfophenyl-5-pyrazolone (0.043) | 179.0 | 1.56 | 12.2 | 0.88 |
| | (c₁) combination of dye (a₁) (0.085) with dye (b₁) (0.043) | 355.0 | 1.35 | 60.5 | 1.60 |
| Ex. 11 | (d₁) 3,3'-diethyl-9-[(3-ethyl-2(3)-benzoxazolylidene) methyl]-oxacarbocyanine iodide (0.085) | 91 | 1.29 | 10.0 | 0.52 |
| | (e₁) 4-[(3 ethyl-2(3)-benzothiazolylidene) isopropylidene]-3-methyl-1-p-sulfophenyl-5-pyrazolone (0.021) | | | too weak to measure accurately. | |
| | (f₁) combination of dye (d₁) (0.064) with dye (e₁) (0.021) | 119 | 1.38 | 38.0 | 1.09 |
| Ex. 12 | (g₁) 1,1'-diethyl-2,2'-cyanine iodide (0.085) | 81.5 | 2.26 | 14.8 | 2.11 |
| | (h₁) 5-[(3-ethyl-2(3)-benzoxazolylidene) ethylidene]-3-p-sulfophenylrhodanine (0.021) | 93.5 | 2.48 | 22.0 | 2.16 |
| | (i₁) combination of dye (g₁) (0.085) with dye (h₁) (0.021) | 135.0 | 2.40 | 64.5 | 2.20 |
| Ex. 13 | (j₁) 1,1'-diethyl-2,2'-cyanine iodide (0.085) | 81.5 | 2.26 | 14.8 | 2.11 |
| | (k₁) 5-[(3-ethyl-6-phenyl-2(3)-benzoxazolylidene)-ethylidene]-3-p-sulfophenyl-2-thio-2,4(3,5)-oxazoledione (0.021) | 76.0 | 2.54 | 5.5 | 2.16 |
| | (l₁) combination of dye (j₁) (0.085) with dye (k₁) (0.021) | 110.0 | 2.60 | 34.5 | 2.53 |
| Ex. 14 | (m₁) 3,3'-ethylenethiacyanine iodide (0.085) | | | too weak to measure accurately. | |
| | (n₁) 5-[(3-ethyl-2(3)-α-naphthoxazolylidene)-ethylidene]-3-β-sulfoethyl-2-thio-2,4(3,5)-oxazoledione (0.064) | 85.0 | 2.80 | 15.5 | 3.15 |
| | (o₁) combination of dye (m₁) (0.085) with dye (n₁) (0.064) | 107.0 | 2.83 | 29.5 | 2.49 |
| Ex. 15 | (p₁) 3,1'-diethyl-6'-methyl-4,5-benzothia-2'-cyanine bromide (0.085) | 110.0 | 2.52 | 43.5 | 1.85 |
| | (q₁) 3-carboxymethyl-5-[(3-ethyl-2(3)-benzoxazolylidene)-ethylidene]-r h o d a n i n e (0.085) | 145.0 | 2.55 | 44.3 | 2.86 |
| | (r₁) combination of dye (p₁) with dye (q₁) | 147.0 | 2.47 | 53.3 | 2.50 |

In the manner described above still many other supersensitizing combinations of one or more acid merocyanine dyes with one or more cyanine, hemicyanine or styryl dyes can be prepared.

The cyanine, hemicyanine or styryl dyes can be incorporated in the emulsions in the usual manner. Ordinarily it is preferable to dissolve the basic dye in a water-miscible solvent, such as methanol or ethanol, and to incorporate the resulting solution of basic dye in the emulsion. The basic dye should be uniformly distributed throughout the emulsion and can be added to the emulsion before, after or simultaneously with the acid merocyanine dye or dyes.

The acid merocyanine dyes are advantageously added to the emulsions by first forming a water-soluble salt of the acid merocyanine dye and dissolving the water-soluble salt in water, methanol or ethanol, or a mixture of water and methanol or ethanol, and dispersing the resulting solution in the emulsion. The salts are advantageously formed by adding the acid merocyanine dye, wet with a little water, methanol or ethanol, to an alkali metal hydroxide, e. g., sodium or potassium hydroxide, or ammonium hydroxide, or an amine, e. g., methylamine, ethylamine, dimethylamine, diethylamine, trimethylamine, triethylamine, ethanolamine, diethanolamine, triethanolamine, pyridine, N-methylpiperidine, n-propylamine, isopropylamine, butylamine, β-ethoxyethylamine, etc. and taking up the salt which forms in a suitable solvent, e. g., water, methanol, ethanol, a mixture of water and methanol, a mixture of water and ethanol, etc. The acid merocyanine dyes can also be added to the emulsions in the free acid forms in solution in an appropriate solvent, e. g., methanol.

Our invention is primarily directed to the ordinarily employed gelatino-silver-halide developing-out emulsions, e. g., gelatino-silver-chloride, -chlorobromide, -chlorobromiodide, -bromide, -bromiodide, and -chloriodide developing-out emulsions. The acid merocyanine dyes or their salts and the basic dyes are advantageously added to the washed, finished emulsions and should be uniformly distributed throughout the emulsions.

The acid merocyanine dyes employed in practicing our invention are described in the copending application of Leslie G. S. Brooker and Frank L. White, Serial No. 605,472, filed July 16, 1945, and in the copending application of Leslie G. S. Brooker and Grafton H. Keyes, Serial No. 605,473, filed July 16, 1945. These acid merocyanine dyes can be prepared by condensing a cyclammonium salt containing in a reactive position a β-arylaminovinyl group or a 4-arylamino-1,3-butadienyl group, with a heterocyclic compound containing 5 atoms in the ring and containing a ketomethylene group (—CH₂—CO—) group in the ring and containing at least one group selected from the group consisting of sulfo and carboxyl groups. The condensations are advantageously carried out in the presence of a tertiary amine, e. g., triethylamine. Dimethine acid merocyanine dyes containing a substituent on the dimethine chain can also be prepared by condensing a cyclammonium quaternary salt containing in a reactive position a β-alkyl- (or aryl) -β-alkylmercaptovinyl group, with a heterocyclic compound containing 5 atoms in the ring and containing a ketomethylene (—CO—CH₂—) group in the ring and containing at least one group selected from the group consisting of sulfo and carboxyl groups. The condensations are advantageously carried out in the presence of a tertiary amine, e. g., triethylamine.

The following examples will illustrate the preparation of five of these acid merocyanine dyes.

*Example 16.* — 4-[(1-ethyl-2(1)-β-naphthothiazolylidene)ethylidene] - 3 - methyl-1-(p-sulfophenyl)-5-pyrazolone

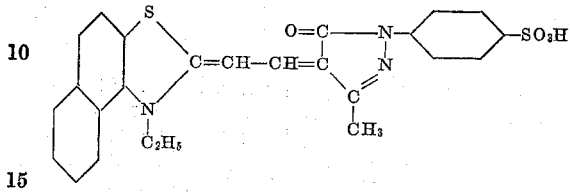

2.02 g. (2 mols.) of triethylamine was added to the suspension of 2.54 g. (1 mol.) of 3-methyl-1-(p-sulfophenyl)-5-pyrazolone and 5.44 g. (1 mol.) of 2 - (2 - acetanilidovinyl) - β - naphthothiazole etho-p-toluenesulfonate in 25 cc. of ethyl alcohol and the mixture was heated at the refluxing temperature for 20 minutes. After chilling at 0° C., the solid was collected on the filter and it was washed with methyl alcohol. The yield of the crude dye-triethylamine salt was 81 per cent. This product was dissolved in aqueous methyl alcohol. The filtrate was treated with an excess of hydrogen chloride, dissolved in methyl alcohol. After chilling at 0°, the dye was washed on the filter with methyl alcohol. The residue was given a second purification as above. The dye was obtained in 53 per cent yield as yellowish orange crystals and had a melting point about 315° C. and sensitized a photographic gelatino-silver-bromiodide emulsion to about 590 mμ. with maximum sensitivity at about 540 mμ.

*Example 17.* — 4 - [(5-chloro-3-ethyl-2(3)-benzothiazolylidene) - α-ethylethylidene]-3-methyl-1-(p-sulfophenyl)-5-pyrazolone

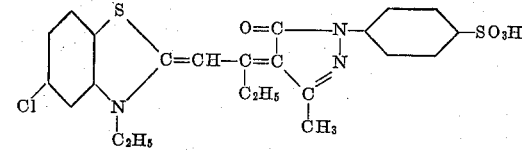

1.42 g. (1 mol.) of 5-chloro-3-ethyl-2-thiopropionylmethylenebenzothiazoline and 0.93 g. (1 mol.) of methyl p-toluenesulfonate were heated together at the temperature of the steam bath for about 5 hours. To this crude quaternary salt were added 1.27 g. (1 mol.) of 3-methyl-1-(p-sulfophenyl)-5-pyrazolone, 20 cc. of ethyl alcohol and 1.01 g. (2 mols.) of triethylamine. The mixture was heated at the refluxing temperature for 20 minutes. An excess of hydrogen chloride, dissolved in methyl alcohol, was added to the chilled mixture. The solid was collected on a filter and washed with methyl alcohol. The product was dissolved as the triethylamine salt in about 50 cc. of methyl alcohol and the solution was filtered. An excess of hydrogen chloride, dissolved in methyl alcohol, was added to the chilled filtrate. The product was collected on a filter and washed with methyl alcohol. After another purification, the yield of dye was 54 per cent and the orange-red crystals had a melting point of 294–296° C. with decomposition and sensitized a photographic gelatino-silver-bromiodide emulsion to about 560 mμ with maximum sensitivity at about 525 mμ.

*Example 18.*—*4 - [(3-ethyl-2(3)-benzothiazolylidene)isopropylidene]-3methyl-1-(p-sulfophenyl)-5-pyrazolone*

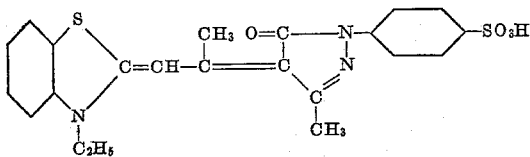

This dye was prepared by using 1 mol. of 2-(2-methylmercaptopropenyl)benzothiazole etho - p-toluenesulfonate instead of the addition product of 5 - chloro-3-ethyl-2-thiopropionylmethylenebenzothiazoline and methyl-p-toluenesulfonate, employed in Example 17. The deep yellow crystals had a melting point above 315° C. and sensitized a photographic gelatino-silver-bromiodide emulsion to about 570 mµ with maximum sensitivity at about 520 mµ.

*Example 19.*—*4-[(3-ethyl-2(3)-benzothiazolylidene) - 2 - butenylidene]-3-methyl-1-(p-sulfophenyl)-5-pyrazolone*

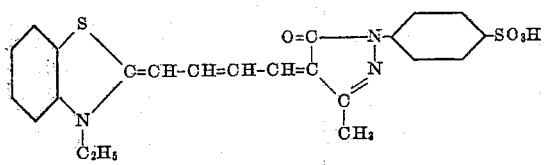

0.51 g. (1 mol.) of triethylamine was added to a suspension of 2.38 g. (1 mol.) of 2-(4-acetanilido-1,3-butadienyl)-benzothiazole ethiodide and 1.27 g. (1 mol.) of 3-methyl-1-(p-sulfophenyl)-5-pyrazolone in 10 cc. of dry pyridine and the mixture was heated at the refluxing temperature for 5 minutes. The cool reaction mixture was stirred with 250 cc. of ether. After chilling at 0° C., the ether layer was decanted, the sticky residue was stirred with a fresh portion of ether. After decanting the ether, the residue was dissolved in methyl alcohol and an excess of acetic acid was added. After chilling at 0° C., the solid was collected on the funnel and washed with methyl alcohol. The crude product was extracted with successive portions of boiling methyl alcohol in order to remove the blue dye. The yield of crude dye was 43 per cent. The dye was purified by dissolving its triethylamine salt in methyl alcohol, filtering the solution and adding an excess of acetic acid to the chilled filtrate. After chilling at 0° C., the dye was collected on a filter and washed with methyl alcohol. After a further purification the yield of dye was 24 per cent. The dark green crystals had a melting point of 279–280° C. with decomposition and sensitized a photographic gelatino-silver-bromiodide emulsion weakly to about 700 mµ with maximum sensitivity at about 630 mµ.

*Example 20.*—*3-carboxymethyl-5-[(3-ethyl-2(3)-benzoxazolylidene)-ethylidene]rhodanine*

2.2 g. (1 mol.) of 2-β-acetanilidovinylbenzoxazole ethiodide, 1.1 g. (1 mol.) of 3-carboxymethylrhodanine, 25 cc. of absolute ethyl alcohol and 1.01 g. (1 mol.) of triethylamine were mixed together and refluxed for 30 minutes. After chilling, the mixture was acidified by addition of 4 cc. of glacial acetic acid and the dye separated. The crude washed dye was purified by dissolving in ethyl alcohol with triethylamine added, filtering hot and then making acid with glacial acetic acid and chilling. It was obtained as scarlet plates M. P. 307° C. dec.

Monomethine cyanine, trimethine cyanine, dimethine hemicyanine and styryl dyes are well known in the art. Such dyes are discussed and defined in Mees, the Theory of the Photographic Process, the MacMillan Company, New York, 1942. Especially useful in practicing our invention are the:

(A) 1,1'-dialkyl-2,2'-cyanine salts, e. g.:
    1,1'-diethyl-2,2'-cyanine iodide
    1,1'-dimethyl-2,2'-cyanine iodide
    1,1'-diethyl-3'-methyl-2,2'-cyanine iodide*
    1,1'-diethyl-5,6-benzo-2,2'-cyanine iodide
    1,1'-diethyl-3,4-benzo-2,2'-cyanine iodide*
(B) 3,1'-dialkylthia-2'-cyanine salts, e. g.:
    3-methyl-1'-ethylthia-2'-cyanine iodide
    3,1'-diethyl-6'-methylthia-2'-cyanine iodide
    3,1'-diethyl-6'-methoxythia-2'-cyanine iodide
(C) 3,1'-dialkyl-4,5-benzothia-2'-cyanine salts, e. g.:
    3,1'-diethyl-4,5-benzothia-2'-cyanine bromide
    3,1'-diethyl-6'-methyl-4,5-benzothia-2'-cyanine bromide
(D) 3,1'-dialkyl-6,7-benzothia-2'-cyanine salts, e. g.:
    3,1'-diethyl-6,7-benzothia-2'-cyanine bromide
(E) 3,1'-dialkylselena-2'-cyanine salts, e. g.:
    3,1'-diethylselena-2'-cyanine iodide
(F) 3,3',9-trialkyloxacarbocyanine salts, e. g.:
    3,3',9-triethyloxacarbocyanine iodide
(G) 3,3',9-trialkyloxathiacarbocyanine salts, e. g.:
    3,3'-diethyl-9-methyloxathiacarbocyanine bromide
    3,3',9-triethyloxathiacarbocyanine bromide
(H) 3,3',9-trialkyloxaselenacarbocyanine salts, e. g.:
    3,3'-diethyl-9-methyloxaselenacarbocyanine bromide
(I) 3,3',9-trialkyl-4',5'-benzoxathiacarbocyanine salts, e. g.:
    3,3'-diethyl-9-methyl-4',5'-benzoxathiacarbocyanine bromide

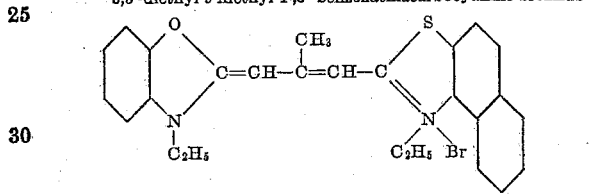

(J) 3,3',9-trialkyl-6,7-benzoxathiacarbocyanine salts, e. g.:
    3,3'-diethyl-9-methyl-6,7-benzoxathiacarbocyanine bromide

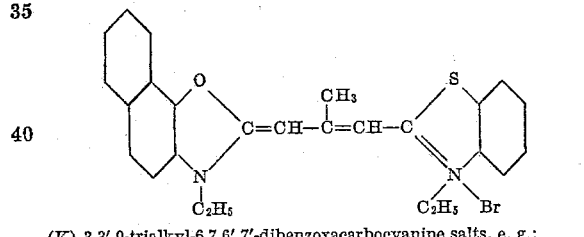

(K) 3,3',9-trialkyl-6,7,6',7'-dibenzoxacarbocyanine salts, e. g.:
    3,3',9-triethyl-6,7,6',7'-dibenzoxacarbocyanine iodide
    3,3'-diethyl-9-methyl-6,7,6',7'-dibenzoxacarbocyanine iodide
(L) 1,1'-dialkyl-2,4'-cyanine salts, e. g.:
    1,1'-diethyl-6,6'-dimethyl-2,4'-cyanine iodide
(M) 3,3'-ethylenethiacyanine salts, e. g.:
    3,3'-ethylenethiacyanine iodide
(N) 3,3'-ethyleneoxacyanine salts, e. g.:
    3,3'-ethyleneoxacyanine iodide
(O) 3,3'-dialkyloxacarbocyanine salts, e. g.:
    3,3'-diethyloxacarbocyanine iodide
(P) 2-[β-(1-piperidyl)vinyl]-benzothiazole alkyl quaternary salts, e. g.:
    2-[β-(1-piperidyl)vinyl]-benzothiazole methochloride
(Q) 2-[β-(1-piperidyl)vinyl] - β - naphthothiazole alkyl quaternary salts, e. g.:
    2-[β-(1-piperidyl)vinyl]-β-naphthothiazole ethiodide
(R) 2-[β-(1-piperidyl)vinyl]-benzoselenazole alkyl quaternary salts, e. g.:
    2-[β-(1-piperidyl)vinyl]-benzoselenazole ethiodide
(S) 2-[β-(1-morpholyl)vinyl]-benzothiazole alkyl quaternary salts, e. g.:
    2-[β-(1-morpholyl)vinyl]-benzothiazole ethiodide
(T) 2-[β-(1-morpholyl)vinyl]-β-naphthothiazole alkyl quaternary salts, e. g.:
    2-[β-(1-morpholyl)vinyl]-β-naphthothiazole ethiodide
(U) 2-[β-(1-morpholyl)vinyl]-benzoselenazole alkyl quaternary salts, e. g.:
    2-[β-(1-morpholyl)vinyl]-benzoselenazole ethiodide
(V) 2-(p-dialkylaminostyryl)pyridine alkyl quaternary salts, e. g.:
    2-(p-dimethylaminostyryl)pyridine ethiodide
(W) 2-(p-dialkylaminostyryl)benzothiazole alkyl quaternary salts, e. g.:
    2-(p-dimethylaminostyryl)benzothiazole ethiodide
(X) 2-(p-dialkylaminostyryl)-β-naphthothiazole alkyl quaternary salts, e. g.:
    2-(p-dimethylaminostyryl)-β-naphthothiazole ethiodide
(Y) 2-(p-dialkylaminostyryl)benzoselenazole alkyl quaternary salts, e. g.:
    2-(p-dimethylaminostyryl)benzoselenazole ethiodide
(Z) 2-(p-dialkylaminostyryl)quinoline alkyl quaternary salts, e. g.:
    2-(p-dimethylaminostyryl)quinoline ethiodide
(A₁) 3,3'-dialkyl-9-[(3-alkyl-2(3)-benzoxazolylidene)methyl]-oxacarbocyanine salts, e. g.:
    3,3'-diethyl-9-[(3-ethyl-2(3)-benzoxazolylidene) methyl]-oxacarbocyanine iodide

*Without sensitizing action by itself.

(B₁) 3,3'-dialkyl-9-alkyl-4,5-benzoxathiacarbocyanine salts, e. g.:
3'-ethyl-3,9-dimethyl-4,5-benzoxathiacarbocyanine iodide

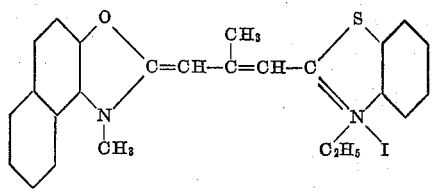

In all of the above groups of basic dyes those in which the alkyl groups contain from 1 to 4 carbon atoms are advantageously employed and those in which the alkyl groups are of the formula $C_dH_{2d+1}$ wherein $d$ represents a positive integer of from 1 to 2 are ordinarily most useful. The anion in the above basic dyes can be any anion, e. g., chloride, bromide, iodide, p-toluenesulfonate, methylsulfate, ethylsulfate, perchlorate, sulfamate, etc.

Among the acid merocyanine dyes those in which the R group represents an alkyl group containing from 1 to 4 carbon atoms are advantageously employed and those in which the R group represents an alkyl group containing from 1 to 2 carbon atoms are ordinarily most useful. The acid merocyanine dyes of the following general formula are especially advantageously employed in practicing our invention:

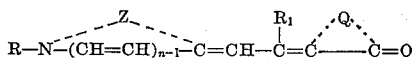

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ where $d$ represents a positive integer of from 1 to 2, Q represents the non-metallic atoms necessary to complete a heterocyclic nucleus containing 5 atoms in the heterocyclic ring (especially a 5-pyrazolone nucleus) and containing a member selected from the group consisting of carboxyl and sulfo groups and the alkali metal and ammonium salt forms of these groups, and Z represents the non-metallic atoms necessary to complete a heterocyclic nucleus containing from 5 to 6 atoms in the heterocyclic ring.

Emulsions prepared in accordance with our invention can be coated in the usual manner on any suitable support, such as glass, cellulose acetate film, cellulose nitrate film, polyvinyl acetal resin film, paper of a suitable metal support.

3,3'-ethylenethiacyanine salts and 3,3'-ethyleneoxacyanine salts are described in the copending application of Leslie G. S. Brooker and Robert H. Sprague, Serial No. 563,086, filed November 11, 1944, as are other N,N'-ethylenecyanine salts.

The accompanying drawing illustrates the supersensitizing effect obtained with three of our new combinations in silver bromoiodide emulsions. Each figure of the drawing is a diagrammatic reproduction of two spectrograms. In each figure the sensitivity of the emulsion containing only the basic dye is represented by the lower curve. The upper curve represents the sensitivity conferred on the emulsion by the combination of the acid and the basic dye. No curve showing the sensitivity conferred on the emulsion by the acid dye alone is shown since the sensitivity conferred by the acid dye in question is too weak to be significant in the comparisons shown. In Figure 1, curve A represents the sensitivity of an ordinary gelatino-silver-bromoiodide emulsion sensitized with 2-(p-diethylaminostyryl)pyridine ethiodide and curve B represents the sensitivity of the same emulsion containing 2-(p-diethylaminostyryl)pyridine ethiodide together with 4-[(3-ethyl - 2(3) - benzothiazolylidene)isopropylidene]-3-methyl-1-p-sulfophenyl - 5-pyrazolone. In Figure 2, curve C represents the sensitivity of an ordinary gelatino-silver-bromoiodide emulsion sensitized with 3,1'-diethyl-6'-methyl-4,5-benzothia-2'-cyanine bromide and curve D represents the sensitivity of the same emulsion containing 3,1'-diethyl-6'-methyl- 4,5 -benzothia-2'-cyanine bromide together with 4-[(3-ethyl-2(3)-benzothiazolylidene)isopropylidene] - 3 - methyl-1-p-sulfophenyl-5-pyrazolone. In Figure 3, curve E represents the sensitivity of an ordinary gelatino-silver-bromoiodide emulsion sensitized with 1,1'-diethyl-2,2'-cyanine iodide and curve F represents the sensitivity of the same emulsion containing 1,1'-diethyl-2,2'-cyanine iodide together with 4-[(3 - ethyl - 2(3) - benzothiazolylidene) ethylidene]-3-methyl-1-p-sulfophenyl-5-pyrazolone.

3,3'-ethylene-thiacyanine salts can be prepared by reacting di-2-benzothiazolylmethane with ethylene di-p-toluenesulfonate, followed by reacting upon the resulting hydro salt with an acid-binding agent. 3,3'-ethyleneoxacyanine salts and other N,N'-ethylenecyanine salts can be similarly prepared. The following examples show the preparation of two of these 3,3'-ethylenecyanine salts.

*Example 21.—3,3'-ethylenethiacyanine iodide*

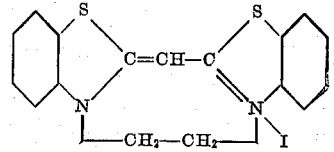

8.4 g. (1 mol.) of di-2-benzothiazolylmethane and 11.1 g. (1 mol.) of ethylene di-p-toluenesulfonate were heated together for 5 hours, at 170° C. The resulting solid yellow product was cooled and crushed under 25 cc. of acetone. The crushed yellow product was filtered off with suction and washed on the filter with acetone. The hydro-p-toluenesulfonate thus obtained was suspended in 50 cc. of hot methyl alcohol and an excess of triethylamine was added to the suspension. The yellow solid dissolved at once, giving a clear yellow solution. An excess of sodium iodide, dissolved in 20 cc. of hot methyl alcohol, was added to the yellow solution to convert the 3,3'-ethylenecyanine p-toluene-sulfonate to the more insoluble 3,3'-ethylenecyanine iodide. The resulting mixture was chilled to 0° C., filtered with suction, and the cyanine iodide washed on the filter with methyl alcohol and with water. The yield of yellow crystals of 3,3'-ethylenethiacyanine iodide was 6 g. (46%). After recrystallization from methyl alcohol (140 cc. per gram of cyanine iodide), the product melted above 330° C. The yield after recrystallization was 38%.

*Example 22.—3,3'-ethyleneoxacyanine iodide*

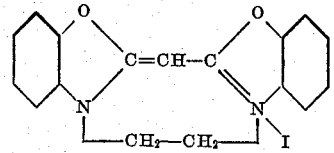

2.6 g. (1 mol.) of di-2-benzoxazolylmethane and 3.7 g. (1 mol.) of ethylene di-p-toluenesulfonate were heated together at 230° C. for 10 minutes. The resulting viscous greenish product was cooled, washed by decantation with 15 cc. of acetone and dissolved in 20 cc. of hot methyl alcohol. To the resulting solution containing the hydro-p-toluenesulfonate were added 2 cc. of triethylamine. The 3,3'-ethyleneoxacyanine p-toluenesulfonate was converted to the more insoluble 3,3'-ethyleneoxacyanine iodide by adding to the mixture an excess of sodium iodide dissolved in hot methyl alcohol. The mixture was then chilled to 0° C., the cyanine iodide filtered off with suction, washed on the filter with water and then with acetone. After recrystallization from methyl alcohol, the product consisted of a mixture of pale yellow needles and colorless crystals. The colorless material was removed by extraction with three 25 cc. portions of acetone. The remaining yellow crystals were then recrystallized from methyl alcohol (100 cc. per gram of crystals). The recrystallized yield was 0.3 g. (8%). The cyanine iodide melted above 325° C.

What we claim as our invention and desire to be secured by Letters Patent of the United States is:

1. A photographic silver halide emulsion sensitized with a supersensitizing combination of at least one acid merocyanine dye selected from the group consisting of those represented by the following general formula:

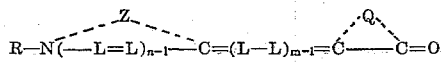

wherein R represents a member selected from the group consisting of an alkyl group and an aryl group, L represents a methine group, $n$ represents a positive integer of from 1 to 2, $m$ represents a positive integer of from 2 to 3, Q represents the non-metallic atoms necessary to complete a heterocyclic nucleus containing 5 atoms in the heterocyclic ring and containing a member selected from the group consisting of carboxyl and sulfo groups and the metal and ammonium salt forms of these groups, and Z represents the non-metallic atoms necessary to complete a heterocyclic nucleus containing from 5 to 6 atoms in the heterocyclic ring, and at least one basic dye selected from the group consisting of monomethine cyanine dyes, trimethine cyanine dyes, dimethine hemicyanine dyes and styryl dyes.

2. A photographic gelatino-silver-halide developing-out emulsion sensitized with a supersensitizing combination of at least one acid merocyanine dye selected from the group consisting of those represented by the following general formula:

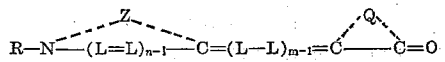

wherein R represents a member selected from the group consisting of an alkyl group and an aryl group, L represents a methine group, $n$ represents a positive integer of from 1 to 2, $m$ represents a positive integer of from 2 to 3, Q represents the non-metallic atoms necessary to complete a heterocyclic nucleus containing 5 atoms in the heterocyclic ring and containing a member selected from the group consisting of carboxyl and sulfo groups and the metal and ammonium salt forms of these groups, and Z represents the non-metallic atoms necessary to complete a heterocyclic nucleus containing from 5 to 6 atoms in the heterocyclic ring, and at least one basic dye selected from the group consisting of monomethine cyanine dyes, trimethine cyanine dyes, dimethine hemicyanine dyes and styryl dyes.

3. A photographic gelatino-silver-halide developing-out emulsion sensitized with a supersensitizing combination of at least one acid merocyanine dye selected from the group consisting of those represented by the following general formula:

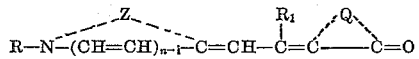

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a heterocyclic nucleus containing 5 atoms in the heterocyclic ring and containing a member selected from the group consisting of carboxyl and sulfo groups and the alkali metal and ammonium salt forms of these groups, and Z represents the non-metallic atoms necessary to complete a heterocyclic nucleus containing from 5 to 6 atoms in the heterocyclic ring, and at least one basic dye selected from the group consisting of monomethine cyanine dyes, trimethine cyanine dyes, dimethine hemicyanine dyes and styryl dyes.

4. A photographic gelatino-silver-halide developing-out emulsion sensitized with a supersensitizing combination of at least one merocyanine dye selected from the group consisting of those represented by the following general formula:

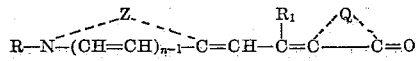

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a 5-pyrazolone nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one basic dye selected from the group consisting of monomethine cyanine dyes, trimethine cyanine dyes, dimethine hemicyanine dyes and styryl dyes.

5. A photographic gelatino-silver-halide developing-out emulsion sensitized with a supersensitizing combination of at least one merocyanine dye selected from the group consisting of those represented by the following general formula:

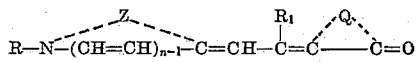

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a 5-pyrazolone nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one monomethine cyanine dye in which the alkyl groups attached to the nitrogen atoms are alkyl groups of the formula $C_dH_{2d+1}$ wherein $d$ represents a positive integer of from 1 to 2.

6. A photographic gelatino-silver-halide developing-out emulsion sensitized with a supersensitizing combination of at least one merocyanine dye selected from the group consisting of those represented by the following general formula:

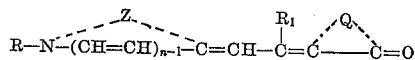

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a 5-pyrazolone nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one N,N'-ethylenecyanine salt.

7. A photographic gelatino-silver-halide developing-out emulsion sensitized with a supersensitizing combination of at least one merocyanine dye selected from the group consisting of those represented by the following general formula:

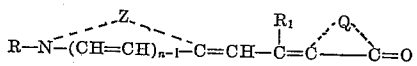

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a 5-pyrazolone nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one 3,3'-ethylenethiacyanine salt.

8. A photographic gelatino-silver-halide developing-out emulsion sensitized with a supersensitizing combination of at least one merocyanine dye selected from the group consisting of those represented by the following general formula:

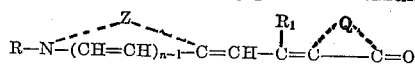

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a 5-pyrazolone nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one 3,1'-dialkyl-4,5-benzothia-2'-cyanine salt in which each of the alkyl groups is an alkyl group of the formula $C_dH_{2d+1}$ wherein $d$ represents a positive integer of from 1 to 2.

9. A photographic gelatino-silver-halide developing-out emulsion sensitized with a supersensitizing combination of at least one merocyanine dye selected from the group consisting of those represented by the following general formula:

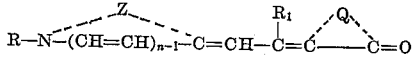

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a rhodanine nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one monomethine cyanine dye.

10. A photographic gelatino-silver-halide developing-out emulsion sensitized with a supersensitizing combination of at least one merocyanine dye selected from the group consisting of those represented by the following general formula:

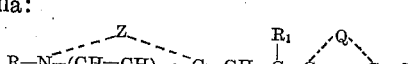

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a rhodanine nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one 1,1'-dialkyl-2,2'-cyanine salt in which each of the alkyl groups is an alkyl group of the formula $C_dH_{2d+1}$ wherein $d$ represents a positive integer of from 1 to 2.

11. A photographic silver halide developing-out emulsion sensitized with a supersensitizing combination of at least one acid merocyanine dye selected from the group consisting of those represented by the following general formula:

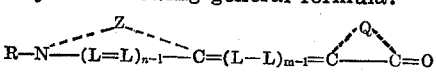

wherein R represents a member selected from the group consisting of an alkyl group and an aryl group, L represents a methine group, $n$ represents a positive integer of from 1 to 2, $m$ represents a positive integer of from 2 to 3, Q represents the non-metallic atoms necessary to complete a heterocyclic nucleus containing 5 atoms in the heterocyclic ring and containing a member selected from the group consisting of carboxyl and sulfo groups and the metal and ammonium salt forms of these groups, and Z represents the non-metallic atoms necessary to complete a heterocyclic nucleus containing from 5 to 6 atoms in the heterocyclic ring, and at least one basic dye selected from the group consisting of monomethine cyanine dyes, trimethine cyanine dyes, dimethine hemicyanine dyes and styryl dyes.

12. A photographic silver halide developing-out emulsion sensitized with a supersensitizing combination of at least one acid merocyanine dye selected from the group consisting of those represented by the following general formula:

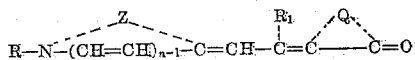

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a heterocyclic nucleus containing 5 atoms in the heterocyclic ring and containing a member selected from the group consisting of carboxyl and sulfo groups and the alkali metal and ammonium salt forms of these groups, and Z represents the non-metallic atoms necessary to complete a heterocyclic nucleus containing from 5 to 6 atoms in the heterocyclic ring, and at least one basic dye selected from the group consisting of monomethine cyanine dyes, trimethine cyanine dyes, dimethine hemicyanine dyes and styryl dyes, the alkyl groups in said basic dyes being alkyl groups of the formula $C_dH_{2d+1}$ wherein $d$ represents a positive integer of from 1 to 2.

13. A photographic silver halide developing-out emulsion sensitized with a supersensitizing combination of at least one merocyanine dye selected from the group consisting of those represented by the following general formula:

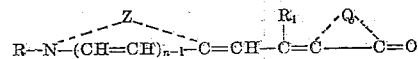

wherein R represents an alkyl group of the formula $C_dH_{2d+1}$ wherein $d$ represents a positive integer of from 1 to 2, $n$ represents a positive integer of from to 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a 5-pyrazolone nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one basic dye selected from the group consisting of monomethine cyanine dyes, trimethine cyanine dyes, dimethine hemicyanine dyes and styryl dyes, the alkyl groups in said basic dyes being alkyl groups of the formula $C_dH_{2d+1}$ wherein $d$ represents a positive integer of from 1 to 2.

14. A photographic silver halide developing-out emulsion sensitized with a supersensitizing combination of at least one merocyanine dye selected from the group consisting of those represented by the following general formula:

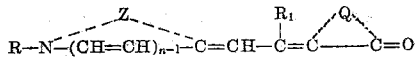

wherein R represents an alkyl group of the formula $C_dH_{2d+1}$ wherein $d$ represents a positive integer of from 1 to 2, $n$ represents a positive integer of from 1 to 2, $R_1$ represents a member selected from the group consisting of a hydrogen atom and an alkyl group of the formula $C_dH_{2d+1}$ wherein $d$ represents a positive integer of from 1 to 2, Q represents the non-metallic atoms necessary to complete a rhodanine nucleus containing a member selected from the group consisting of carboxyl and sulfo groups and the alkali metal and ammonium salt forms of these groups, and Z represents the non-metallic atoms necessary to complete a heterocyclic nucleus containing from 5 to 6 carbon atoms in the heterocyclic ring, and at least one basic dye selected from the group consisting of monomethine cyanine dyes, trimethine cyanine dyes, dimethine hemicyanine dyes and styryl dyes, the alkyl groups in said basic dyes being alkyl groups of the formula $C_dH_{2d+1}$ wherein $d$ represents a positive integer of from 1 to 2.

15. A photographic gelatino-silver-halide developing-out emulsion sensitized with a supersensitizing combination of 3,3'-ethylenethiacyanine iodide and 4-[(3-ethyl-2(3)-benzothiazolylidene)ethylidene] - 3-methyl-1-p-sulfophenyl-5-pyrazolone, pyridine salt.

16. A photographic gelatino-silver-halide developing-out emulsion sensitized with a supersensitizing combination of 1,1'-diethyl-2,2'-cyanine iodide and 4-[(3-ethyl-2(3)-benzothiazolylidene)ethylidene] - 3-methyl-1-p-sulfophenyl-5-pyrazolone.

17. A photographic gelatino-silver-halide developing-out emulsion sensitized with a supersensitizing combination of 3,1'-diethyl-6'-methyl-4,5-benzothia-2'-cyanine bromide and 4-[(3-ethyl - 2(3) -benzothiazolylidene)isopropylidene]-3-methyl-1-p-sulfophenyl-5-pyrazolone.

BURT H. CARROLL.
LESLIE G. S. BROOKER.
JOHN SPENCE.

REFERENCES CITED

The following references are of record in the file of this patent:

UNITED STATES PATENTS

| Number | Name | Date |
| --- | --- | --- |
| 2,218,230 | Carroll | Oct. 15, 1940 |